(12) United States Patent
Feinberg

(10) Patent No.: US 7,737,210 B2
(45) Date of Patent: Jun. 15, 2010

(54) COMPOSITION COMPRISING POLYVINYL CHLORIDE AND ETHYLENE COPOLYMER

(75) Inventor: Stewart Carl Feinberg, Exton, PA (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 768 days.

(21) Appl. No.: 11/644,646

(22) Filed: Dec. 22, 2006

(65) Prior Publication Data

US 2008/0153966 A1 Jun. 26, 2008

(51) Int. Cl.
*C08K 7/14* (2006.01)
(52) U.S. Cl. .................. 524/522; 524/523; 524/524
(58) Field of Classification Search ............... 524/522, 524/523, 524
See application file for complete search history.

(56) References Cited

U.S. PATENT DOCUMENTS

| | | | |
|---|---|---|---|
| 4,329,278 A | * | 5/1982 | Reardon ............ 524/523 |
| 4,365,029 A | * | 12/1982 | Reizer et al. ............ 523/437 |
| 4,373,051 A | * | 2/1983 | Memering ............ 524/427 |
| 6,011,091 A | | 1/2000 | Zehner |
| 6,066,680 A | | 5/2000 | Cope |
| 6,103,791 A | | 8/2000 | Zehner |
| 2003/0229160 A1 | | 12/2003 | Williams |
| 2006/0173105 A1 | | 8/2006 | Griffin |

FOREIGN PATENT DOCUMENTS

JP 405059239 * 3/1993

* cited by examiner

*Primary Examiner*—Bernard Lipman

(57) ABSTRACT

Disclosed is a composition comprising, consisting essentially of, consisting of, or produced from polyvinyl chloride, filler, and an impact strength-retaining amount of a modifier wherein the modifier includes is or an ethylene copolymer, an acid anhydride- or acid monoester-modified polyolefin, or combinations thereof. Also disclosed is a process comprising combining an impact strength-retaining amount of a modifier to a blend that comprises or is produced by combining a rigid PVC and one or more fillers. The combining is carried out under a condition sufficient to prevent or minimize the reduction of impact strength of the blend, to reduce the molten viscosity of the blend, or to minimize the loss in stiffness (flexural modulus) of the blend, in comparison to the unmodified blend.

20 Claims, No Drawings

COMPOSITION COMPRISING POLYVINYL CHLORIDE AND ETHYLENE COPOLYMER

FIELD OF THE INVENTION

The invention relates to a composition comprising polyvinyl chloride and ethylene copolymer and to a product therewith.

BACKGROUND OF THE INVENTION

Almost all PVC that is used in extruded profiles (windows, siding, and doors) is impact-modified to some extent. Recently there has been an increased interest in composition of wood and PVC, particularly for use in home siding applications. Such composites are highly desirable because they resemble traditional wood siding. Moreover, such composition raises the sag temperature of PVC and thus permits the use of dark colors in the composite siding. See, e.g., U.S. Pat. Nos. 6,011,091, 6,103,791, and 6,066,680, and US Patent Application 2003/0229160.

To broaden markets and opportunities for PVC, various reinforcing fillers such as fiberglass or minerals are compounded into rigid PVC formulations in order to increase the stiffness (flexural modulus) of the polymer. Unfortunately, other physical properties are degraded by the addition of the reinforcing filler, usually in direct proportion to the amount of such filler that is added. Consequently, end users of the rigid PVC formulations are constantly searching for additives that prevent or minimize the reduction of such desirable properties. It is also desirable to prevent or minimize the loss of impact properties of the PVC, to improve or reduce the molten viscosity, or to minimize the loss in stiffness of PVC (as compared to the unmodified PVC).

SUMMARY OF THE INVENTION

The invention includes a composition comprising or produced from polyvinyl chloride, filler, and an impact strength-retaining amount of a modifier wherein the modifier is or includes an ethylene copolymer, or an acid anhydride- or acid monoester-modified polyolefin, or combinations thereof.

A process comprising combining an impact strength-retaining amount of a modifier to a blend wherein the blend comprises or is produced by combining PVC or a rigid PVC and one or more fillers; the modifier can be the same as that disclosed above; and the combining is carried out under a condition sufficient to prevent or minimize the reduction of impact strength of the blend, to reduce the molten viscosity of the blend, or to minimize the loss in stiffness (flexural modulus) of the blend, in comparison to the unmodified blend.

A process comprising combining an impact strength-retaining amount of a modifier to a blend wherein the blend comprises or is produced by combining PVC or a rigid PVC and one or more fillers; the modifier can be the same as that disclosed above; and wherein one or more of the modifiers and one or more of the fillers have been combined previously in a separate step.

DETAILED DESCRIPTION OF THE INVENTION

Any filler or additive that may improve the stiffness of PVC may be used. Examples of such fillers include, but are not limited to, one or more glass fibers, hollow glass microspheres, inorganic compounds, such as minerals and salts including $CaCO_3$, silica, silicates such as calcium silicate or metasilicate, clay such as bentonite, mica, talc, alumina trihydrate, magnesium hydroxide, metal oxides, or combinations of two or more thereof. The filler can be present in an amount that is sufficient to improve the stiffness of PVC and can be about 0.001 to about 50, preferably, about 1 to about 25%, or more preferably, from about 2 to about 15%, by weight of the resulting blend.

An ethylene copolymer can comprise repeat units derived from ethylene and, alkyl (meth)acrylate, vinyl acetate, (meth) acrylic acid (completely or partially neutralized (meth) acrylic acid), or combinations of two or more thereof. An ethylene copolymer may comprise up to 35 wt % of an additional comonomer such as carbon monoxide, sulfur dioxide, acrylonitrile, maleic anhydride, dimethyl maleate, diethyl maleate, dibutyl maleate, dimethyl fumarate, diethyl fumarate, dibutyl fumarate, dimenthyl fumarate, maleic acid, maleic acid monoesters, itaconic acid, fumaric acid, fumaric acid monoester, a salt of these acids, glycidyl acrylate, glycidyl methacrylate, and glycidyl vinyl ether, where the ester can be one or more $C_1$ to $C_4$ alcohols (e.g., methyl, ethyl, n-propyl, isopropyl and n-butyl alcohols), combinations of two or more thereof.

Ethylene alkyl (meth)acrylate copolymer comprises repeat units derived from ethylene and alkyl acrylate, alkyl methacrylate, or combinations thereof wherein the alkyl moiety contains from 1 to 8 carbon atoms. Examples of alkyl include methyl, ethyl, propyl, butyl, or combinations of two or more thereof. Alkyl (meth)acrylate comonomer may be incorporated into the ethylene/alkyl (meth)acrylate copolymer from 0.1 weight % up to 45 weight % of the total copolymer or even higher. The alkyl group can contain 1 to about 8 carbons. For example, the alkyl (meth)acrylate comonomer can be present in the copolymer from 5 to 45, 10 to 35, or 10 to 28, weight %. Ethylene alkyl (meth)acrylate copolymers can be produced by processes well known in the art using either autoclave or tubular reactors. See e.g., U.S. Pat. Nos. 5,028,674; 2,897,183; 3,404,134; 5,028,674; 6,500,888 and 6,518,365, the disclosures of which are incorporated herein by reference. Because the processes are well known, the disclosure of which is omitted herein for the interest of brevity. Examples of ethylene alkyl (meth)acrylate copolymers include ethylene acrylate, ethylene methyl acrylate, ethylene ethyl acrylate, ethylene butyl acrylate, ethylene n-butyl acrylate carbon monoxide (ENBACO), ethylene glycidyl methacrylate (EBAGMA), or combinations of two or more thereof such as Elvaloy® commercially available from E. I. du Pont de Nemours and Company, Wilmington, Del. (DuPont). A mixture of two or more different ethylene alkyl (meth)acrylate copolymers can be used.

Ethylene vinyl acetate (EVA) copolymer is a polymer well known to one skilled in the art. The relative amount of vinyl acetate comonomer incorporated into EVA can be from 0.1 weight % up to as high as 40 weight percent of the total copolymer or even higher. For example, EVA can have a vinyl acetate content of from 2 to 50% by weight, 10 to 40%, or 6 to 30% by weight. Example of EVA copolymer also includes ethylene/vinyl acetate/carbon monoxide (EVACO). EVA may be modified by methods well known in the art, including modification with an unsaturated carboxylic acid or its derivatives, such as maleic anhydride or maleic acid. Examples of commercially available EVA includes Elvax® from DuPont.

An example of acid copolymer can be described as E/X/Y copolymer where E is ethylene, X can be at least one unsaturated carboxylic acid disclosed above, and Y is a softening comonomer such as alkyl acrylate, alkyl methacrylate, or combinations thereof. X can be present from about 3 to about 30, 4 to 25, or 5 to 20, weight % of the E/X/Y copolymer, and Y is from 0 to about 35, 0.1 to 35, or 5 to 30, weight % of the E/X/Y copolymer. Specific examples of acid copolymers include ethylene/(meth)acrylic acid copolymers, ethylene/(meth)acrylic acid/n-butyl (meth)acrylate copolymers, ethylene/(meth)acrylic acid/iso-butyl (meth)acrylate copolymers, ethylene/(meth)acrylic acid/tert-butyl (meth)acrylate copolymers, ethylene/(meth)acrylic acid/methyl (meth)acrylate copolymers, ethylene/(meth)acrylic acid/ethyl (meth)acrylate copolymers, ethylene/maleic acid and ethylene/maleic acid monoester copolymers, ethylene/maleic acid monoester/n-butyl (meth)acrylate copolymers, ethylene/maleic acid monoester/methyl (meth)acrylate copolymers, ethylene/maleic acid monoester/ethyl (meth)acrylate copolymers, or combinations of two or more thereof such as Nucrel® commercially available from DuPont.

Ionomers can be prepared from the acid copolymer by treatment with a basic compound capable of neutralizing the acid moieties of the copolymer. The acid groups may be nominally neutralized, 100% or less than 100%, such as any level from about 0.1 to about 99 or 90%, about 15 to about 80%, or about 40 to about 75% with an alkaline earth metal ion, an alkali metal ion, or a transition metal ion including Li, Na, K, Ag, Hg, Cu, Be, Mg, Ca, Sr, Ba, Cd, Sn, Pb, Fe, Co, Zn, Ni, Al, Sc, Hf, Ti, Zr, Ce, or combinations of two or more thereof. Ionomers can also be prepared with nominal neutralization levels higher than 70% as disclosed above when blended with the organic acids. Examples of commercially available ionomers include Surlyn® from DuPont.

Processes for producing acid copolymer and ionomers are well known to one skilled in the art, the description of which is omitted herein for the interest of brevity.

An acid anhydride- or acid monoester-modified polyolefin can be polyethylene (PE) or polypropylene (PP) grafted with an acid anhydride. Polyolefin can include any polymer comprising repeat units derived from an olefin and includes polyethylene, polypropylene, polybutylene, polyisobutylene, and a copolymer of any of these polyolefins. Such copolymer can include comonomers including butene, hexene, octene, decene, dodecene, or combinations of two or more thereof.

For example, polypropylene polymers include homopolymers, random copolymers, block copolymers and terpolymers of propylene. Copolymers of propylene include copolymers of propylene with other olefins such as ethylene, 1-butene, 2-butene and the various pentene isomers, etc., and preferably copolymers of propylene with ethylene. Terpolymers of propylene include copolymers of propylene with ethylene and one other olefin. Random copolymers, also known as statistical copolymers, are polymers in which the propylene and the comonomer(s) are randomly distributed throughout the polymeric chain in ratios corresponding to the feed ratio of the propylene to the comonomer(s). Block copolymers are made up of chain segments consisting of propylene homopolymer and of chain segments consisting of, for example, random copolymer of propylene and ethylene. "Polypropylene refers to any or all of the polymers comprising propylene described above. PP can be produced by well known processes such as Ziegler-Natta catalyst systems. Because the processes are well known, the description of which is omitted here for the interest of brevity. Example also includes copolymer of propylene and ethylene having low levels of the ethylene monomer of between about 1% to about 6% by weight.

Acid anhydride or monoester can include maleic anhydride, itaconic anhydride, fumaric anhydride, maleic acid monoesters, itaconic monoesters, fumaric acid monoester, a salt thereof where the ester can be one or more $C_1$ to $C_4$ alcohols (e.g., methyl, ethyl, n-propyl, isopropyl and n-butyl alcohols), combinations of two or more thereof.

Acid anhydride- or acid monoester-modified polyolefin can be produced by any means known to one skilled in the art. For example, grafts can be produced by melt extrusion of the polyolefin in the presence of both a radical initiator and acid anhydride or its monoester, in a twin-screw extruder. The polymeric backbone on which an acid anhydride (e.g., maleic anhydride) functionality is grafted can be either any polyolefins disclosed above such as PE, PP, low density polyethylene (LDPE), linear low density PE (LLDPE), very low density PE (VLDPE), metallocene-catalyzed linear low-density PE (mLLDPE), metallocene-catalyzed very low-density PE (mVLDPE), or combinations of two or more thereof.

Acid anhydride- or acid monoester-modified polyolefin can also be a direct or graft copolymer of ethylene, a monomer, and optionally a comonomer where the monomer can be vinyl acetate, acrylic acid or its esters, methacrylic acid or its esters, or combinations of two or more thereof, and the comonomer can be carbon monoxide, maleic anhydride or its functional equivalent or combinations of two or more thereof. Example of such polyolefin can be, for example, a copolymer derived from ethylene, carbon monoxide, and butyl acrylate and grafted with maleic anhydride such as FUSABOND® A MG423D (ethylene/alkyl acrylate/CO copolymer that has been modified with 1% maleic anhydride graft), available from DuPont.

Acid anhydride or acid anhydride monoester can be present in the grated polymer, based on the concentration of acid anhydride or acid anhydride monoester, $\geq$about 0.1, $\geq$about 1, $\geq$about 3, $\geq$about 4, or even $\geq$about 5 wt %, of the polymer being grafted.

Example of acid anhydride- or acid monoester-modified polyolefin is FUSABOND® commercially available from DuPont, which includes polyolefins having anhydride functionality such as maleic anhydride or its equivalent maleic and/or its salts, maleic acid mono- or diesters, itaconic acid, fumaric acid, and fumaric acid monoesters.

The compositions can additionally comprise, about 0.001 to about 20 weight % of the composition, one or more additives including plasticizers, stabilizers including viscosity stabilizers and hydrolytic stabilizers, antioxidants, ultraviolet ray absorbers, anti-static agents, dyes, pigments or other coloring agents, inorganic fillers, fire-retardants, lubricants, reinforcing agents such as glass fiber and flakes, foaming or blowing agents, processing aids, antiblock agents, release agents, fusion aid, process aid, calcium carbonate, calcium stearate, titanium oxide, stearic acid, paraffin wax, lubricants, pigments, or combinations of one or more thereof. Optional additives, when used, can be present in various quantities so long as they are not used in an amount that detracts from the basic and novel characteristics of the composition.

Composition can be produced by any methods known to one skilled in the art such as standard mixing practices, as generally known in the art. This can be accomplished in a one-step or a two-step process. In the one-step process, all ingredients can be dry- or melt-compounded using a mixer such as Banbury mixer or twin screw or Buss kneader extruders. In the two-step process, the PVC dry blend can be first prepared in a high intensity mixer such as a Welex mixer. In the second step, the Welex blend is melt-blended with additives such as reinforcing fillers and the modifiers in a melt compounding apparatus such as a Buss Kneader or a twin screw extruder.

The composition can be formed into shaped articles using methods such as injection molding, compression molding, overmolding, or extrusion. Optionally, formed articles can be further processed. For example, pellets, slugs, rods, ropes, sheets and molded articles of the present invention may be prepared and used for feedstock for subsequent operations, such as thermoforming operations, in which the article is subjected to heat, pressure and/or other mechanical forces to produce shaped articles. Compression molding is an example of further processing.

The compositions can be cut, injection molded, compression molded, overmolded, laminated, extruded, milled or the like to provide the desired shape and size to produce commercially usable products. The resultant product may have an appearance similar to wood and may be sawed, sanded, shaped, turned, fastened and/or finished in the same manner as natural wood. It is resistant to rot and decay as well as termite attack and may be used as a replacement for natural wood, for example, as decorative moldings inside or outside of a house, railroad ties, picture frames, furniture, porch decks, railings, window moldings, window components, door components, roofing systems, sidings, or other types of structural members.

The following examples are presented to merely demonstrate and illustrate of the invention.

EXAMPLES

Raw Materials

The raw starting materials, their characterization and respect commercial source are summarized as follows.

PVC: Oxy 216, K-=65 (Oxyvinyls); Vista 5305, K=58 (Vista Chemical Co.).

Stabilizers: Mark 1900, methyl tin heat stabilizer (Crompton Corp.); and Irganox 1076, phenolic antioxidant (Ciba Specialty Chemical Co.).

Fusion Aid/Process Aid/Lubricant: Paraloid K120 (Rohm and Haas); calcium stearate; stearic acid; paraffin wax; and Rheolub 165 (Rohm and Haas).

Fillers and Reinforcing Agents: calcium carbonate; Ti-Pure R960 titanium dioxide (DuPont); ChopVantage, 3790 fiberglass (PPG Industries); Nyglos 8 and 4 W (two grades of calcium metasilicate also known as wollastonite) from Nyco Mineral Co.

Welex Mixer

The following ingredients were combined in the Welex mixer: PVC powder, stabilizers, fusion aid, process aid, paraffin wax, lubricants, pigments. PVC was added to the Welex high intensity mixer and mixed under high shear over the course for about 30 minutes until the temperature reached approximately 80° C. At this point any liquids in the formulation were added and mixing continued. After several minutes, with the temperature at approximately 90° C., the rest of the ingredients were added. After approximately 5 more minutes, the machine was stopped and the contents were discharged.

Extrusion Compounding

A Banbury or commercial thermoplastic extruder, such as a twin-screw extruder (Buss Co-kneader) was used to achieve complete admixing of the components and to give a homogenous dispersion of the components. Typical conditions for the Buss Co-kneader were: Zone 1: 110° C.; Zone 2: 180° C.; Zone 3: 180° C.; Zone 4: 180° C.; Crosshead extruder: 180° C.; Die: 180° C.; Crosshead RPM: 50; Buss RPM: 350; Feed rate: 10 to 20 pounds per hour; and Die: one hole, 1/16" diameter.

Test Samples

Test pieces bars for flexural modulus, tensile properties, and disks (3 inch by 1/8 inch) for physical testing were molded using a single screw injection molding machine using typically the following temperature profile and conditions: Rear: 170° C.; Center: 180° C.; Front: 180° C.; Nozzle: 170° C.; Mold: 25° C.; Ram Speed: Fast; Screw Speed: 50 rpm; Injection Time: 10 seconds; Hold Time: 15 seconds; and Back Pressure: 50 psig.

Tensile properties were determined according to ASTM D638 using 5 inch by 1/2 inch by 1/8 inch) injection molded bars. The measurements were made on an Instron operated at a crosshead speed of 2 inch/minute. Flexural modulus was measured on 5 inch by 1/2 inch by 1/8 inch rectangular bars using a 2 inch span, according to ASTM D790. Notched Izod impact was determined according to ASTM D256 using the central portion of the D638 tensile bars having a 0.1 inch notch machined into the side of the bar. Determination of the Dynatup instrumented impact according to ASTM D3763 was performed in the vertical mode on 3 inch by 1/8 inch disks at Tup Size of 1/2 inch and drop speed of 5 mph (i.e., 10 inch drop in height with 98.2 lb load). The results are shown in Tables 1 and 2 below.

TABLE 1*

|  | Control 1 | Control 2 | Ex 1 | Ex. 2 | Ex 3 | Ex 4 |
|---|---|---|---|---|---|---|
| Fusabond ® A MG-423D |  |  | 7.5 |  | 7.5 |  |
| 67/28/5: E/n-BA/GMA |  |  |  | 12 |  |  |
| Nyglos 8 |  | 12 | 12 | 12 |  |  |
| Nyglos 4W-10012 |  |  |  |  | 12 |  |
| 38.5/61.5: Fusabond ® A MG-423D/Nyglos 4W-10012 pre-Blend |  |  |  |  |  | 19.5 |
| Vista 5305 - PVC | 100 |  |  |  |  |  |
| PVC Oxyvinyls 216 - PVC |  | 100 | 100 | 100 | 100 | 100 |
| Mark 1900 | 2.0 | 2.0 | 2.0 | 2.0 | 2.0 | 2.0 |
| Paraloid K120 | 1.0 | 1.0 | 1.0 | 1.0 | 1.0 | 1.0 |
| Rheolube 165 Paraffin | 1.0 | 1.0 | 1.0 | 1.0 | 1.0 | 1.0 |
| Calcium Stearate | 1.5 | 1.5 | 1.5 | 1.5 | 1.5 | 1.5 |
| Irganox 1076 | 0.2 | 0.2 | 0.2 | 0.2 | 0.2 | 0.2 |
| Stearic Acid | 0.5 | 0.5 | 0.5 | 0.5 | 0.5 | 0.5 |

TABLE 1*-continued

|  | Control 1 | Control 2 | Ex 1 | Ex. 2 | Ex 3 | Ex 4 |
|---|---|---|---|---|---|---|
| Flexural Modulus | | | | | | |
| psi | 369000 | 499000 | 408000 | 373000 | 412000 | 386000 |
| Notched Izod Impact @ Room Temperature (D638 Tensile Bar) | | | | | | |
| ft-lbs/in | 0.96 | 1.40 | 1.78 | 2.09 | 1.7 | 2.06 |
| Standard deviation | 0.27 | .28 | 0.21 | .51 | 0.6 | 0.63 |
| Failure Mode | Brittle | Brittle | Brittle | Ductile | Brittle | Brittle |
| Capillary Rheology, Pa * Sec @ 190° C. | | | | | | |
| Shear Rate (1/sec) | | | | | | |
| 10.0 | 14220 | 15514 | 16738 | 29905 | 22770 | 25715 |
| 50.1 | 4693 | 5270 | 4920 | 8044 | 6391 | 7038 |
| 100.2 | 3176 | 3383 | 2965 | 4938 | 3989 | 4330 |
| 501.2 | 1174 | 1181 | 1116 | 1311 | 1335 | 1403 |
| 1002.3 | 713 | 726 | 716 | 738 | 792 | 784 |
| 2004.6 | 386 | 396 | 396 | 395 | 418 | 410 |
| 3006.9 | 267 | 274 | 271 | 272 | 287 | 276 |
| 4009.1 | 202 | 200 | 204 | 210 | 215 | 209 |
| 5011.4 | 163 | | | 163 | 173 | 168 |

*The numbers shown for individual ingredients were parts per hundred (phr) of PVC; Fusabond ® A MG-423D was maleic anhydride-grafted ethylene (60 wt %), n-butylacrylate (30%), and CO (10%), containing 0.8 wt % anhydride of the polymer; and E/n-BA/GMA denotes copolymer of ethylene, n-butylacrylate, and glycidyl methacrylate.

TABLE 2*

|  | Ex 5 Control | Ex-6 Control | Ex 7 | Ex 8 | Ex. 9 | Ex 10 Control | Ex 11 |
|---|---|---|---|---|---|---|---|
| Elvaloy AC 1335 | | | | 7.5 | | | |
| Surlyn ® 9320 | | | 7.5 | | | | |
| Fusabond ® A ME-556D | | | | | 7.5 | | |
| Elvaloy HP662 | | | | | | | 7.5 |
| PPG 3790 Fiberglass | | | | | | 10 | 10 |
| Nyglos 8 | | 10.0 | 10 | 10.0 | | | |
| Vista 5305 - PVC | | 100 | 100 | 100 | 100 | 100 | 100 |
| PVC Oxyvinyls 216 - PVC | 100 | | | | | | |
| Mark 1900 | 2.0 | 2.0 | 2.0 | 2.0 | 2.0 | 2.0 | 2.0 |
| Paraloid K120 | 1.0 | 1.0 | 1.0 | 1.0 | 1.0 | 1.0 | 1.0 |
| Rheolube 165 Paraffin | 1.0 | 1.0 | 1.0 | 1.0 | 1.0 | 1.0 | 1.0 |
| Calcium Stearate | 1.5 | 1.5 | 1.5 | 1.5 | 1.5 | 1.5 | 1.5 |
| Irganox 1076 | 0.2 | 0.2 | 0.2 | 0.2 | 0.2 | 0.2 | 0.2 |
| Stearic Acid | 0.5 | 0.5 | 0.5 | 0.5 | 0.5 | 0.5 | 0.5 |
| Flexural Modulus (psi) | 333000 | 338000 | 356000 | 386000 | 375000 | 384000 | 405000 |
| Tensile Properties @ RT (D638) | | | | | | | |
| Young's Modulus (psi) | 452000 | 469000 | 507000 | 588000 | 562000 | | |
| Tensile @ Yield (psi) | 75000 | 7500 | 6300 | 6600 | 65000 | | |
| Elongation@ Yield (%) | 3 | 3 | 3 | 3 | 3 | | |
| Peak Tensile (psi) | 7500 | 7500 | 9300 | 6600 | 6500 | | |
| Elongation @ Peak Tensile (%) | 3 | 3 | 3 | 3 | 3 | | |
| Tensile @ Break (psi) | 5700 | 5900 | | 3100 | 5000 | | |
| Elongation @ Break (psi) | 49 | 74 | | 40 | 26 | | |
| Notched Izod Impact @ Room Temperature (D638 Tensile Bar) | | | | | | | |
| ft-lbs/in | 1.78 | 1.84 | 1.44 | 2.49 | 1.27 | 0.94 | 1.85 |
| Standard deviation | .86 | 0.91 | 0.55 | 1.08 | 0.57 | 0.23 | .95 |
| Failure Mode | Brittle | Brittle | Ductile | Brittle | Brittle | Brittle | Brittle |
| Notched Izod Impact @ 0° C. (D638 TensileBar) | | | | | | | |
| Ft-lbs/in | 0.49 | 2.05 | 0.72 | 1.81 | 2.50 | | |
| Standard Deviation | .11 | 1.85 | .23 | 0.45 | 1.53 | | |
| Failure Mode | Brittle | Brittle | Brittle | Brittle | Brittle | | |
| HDT @ 264 psi | | | | | | | |
| ° C. | 62.7 | 62.7 | 62.7 | 62.7 | 63.1 | | |
| Capillary Rheology @ 190° C. (Pa * Sec) | | | | | | | |
| Shear Rate (1/sec) | | | | | | | |
| 10.0 | 9153 | 9323 | 9160 | 8797 | 15518 | 17385 | 11751 |
| 50.1 | 3297 | 3281 | 3200 | 3389 | 5152 | 5929 | 4025 |
| 100.2 | 2055 | 2298 | 2097 | 2289 | 3386 | 3811 | 2674 |
| 501.2 | 808 | 846 | 754 | 833 | 1054 | 1136 | 901 |

TABLE 2*-continued

|  | Ex 5 Control | Ex-6 Control | Ex 7 | Ex 8 | Ex. 9 | Ex 10 Control | Ex 11 |
|---|---|---|---|---|---|---|---|
| 1002.3 | 510 | 520 | 476 | 494 | 612 | 661 | 537 |
| 2004.6 | 306 | 308 | 289 | 284 | 340 | 366 | 305 |
| 3006.9 | 220 | 224 | 213 | 204 | 237 | 255 | 219 |
| 4009.1 | 174 | 174 | 170 | 158 | 179 | 196 | 172 |
| 5011.4 | 142 | 141 | 141 | 127 | 146 | 156 | 137 |

*Elvaloy AC 1335 was a copolymer of ethylene and methyl acrylate (35 wt %); Surlyn ® 9320 was an Surlyn ® 9320 was a copolymer of ethylene, n-butyl acrylate (23.5%), methacrylic acid (9 wt %) ionomer having 51% neutralization with zinc; Fusabond ® A MG-556D was maleic anhydride-grafted copolymer of 76 wt % ethylene and 24 wt % methyl acrylate containing 1.8 wt % anhydride of the copolymer; and Elvaloy ® HP662 was the same as Fusabond ® A MG-423D without maleic anhydride.

The invention claimed is:

1. A composition comprising, or produced from, polyvinyl chloride, filler, and an impact strength-retaining amount of a modifier wherein the modifier is an ethylene copolymer, an acid anhydride- or acid monoester-modified polyolefin, or combinations thereof;
    the filler includes glass fiber, hollow glass microsphere, $CaCO_3$, silica, calcium silicate, calcium metasilicate, clay, mica, talc, alumina trihydrate, magnesium hydroxide, metal oxides, or combinations of two or more thereof;
    the ethylene copolymer is ethylene alkyl (meth)acrylate copolymer, ethylene butyl acrylate glycidyl methyl acrylate copolymer, ethylene (meth)acrylic acid copolymer or its corresponding ionomer, ethylene butyl acrylate (meth)acrylic acid copolymer or its corresponding ionomer, or combinations of two or more thereof; and
    the acid anhydride or acid monoester includes maleic anhydride, itaconic anhydride, fumaric anhydride, maleic acid monoesters, itaconic monoesters, fumaric acid monoester, a salt of thereof, combinations of two or more thereof.

2. The composition of claim 1 wherein the modifier is the ethylene butyl acrylate glycidyl methyl acrylate copolymer.

3. The composition of claim 1 wherein the modifier is ethylene methyl acrylate copolymer.

4. The composition of claim 1 wherein the modifier is the ethylene alkyl (meth)acrylic acid copolymer or its corresponding ionomer.

5. The composition of claim 1 wherein the filler is the glass fiber.

6. The composition of claim 1 wherein the ethylene copolymer is the ethylene butyl acrylate copolymer.

7. The composition of claim 4 wherein the modifier is an ionomer of an ethylene butyl acrylate methacrylic acid copolymer.

8. The composition of claim 1 wherein the modifier is the acid anhydride- or acid monoester-modified polyolefin.

9. The composition of claim 7 wherein the modifier is the acid anhydride-modified polyolefin, the acid anhydride is maleic anhydride, and the polyolefin is polyethylene, polypropylene, or combinations thereof.

10. The composition of claim 7 wherein the modifier is the maleic anhydride-modified polyethylene, polypropylene, or combinations thereof.

11. The composition of claim 10 wherein the filler is the glass fiber.

12. A process comprising combining an impact strength-retaining amount of a modifier and a filler with PVC to produce a blend wherein
    the modifier is an ethylene copolymer, an acid anhydride- or acid monoester-modified polyolefin, or combinations thereof;
    the filler includes glass fiber, hollow glass microsphere, $CaCO_3$, silica, calcium silicate, calcium metasilicate, clay, mica, talc, alumina trihydrate, magnesium hydroxide, metal oxides, or combinations of two or more thereof;
    the ethylene copolymer is ethylene alkyl (meth)acrylate copolymer, ethylene butyl acrylate glycidyl methyl acrylate copolymer, ethylene (meth)acrylic acid copolymer or its corresponding ionomer, ethylene butyl acrylate (meth)acrylic acid copolymer or its corresponding ionomer, or combinations of two or more thereof;
    the acid anhydride or acid monoester includes maleic anhydride, itaconic anhydride, fumaric anhydride, maleic acid monoesters, itaconic monoesters, fumaric acid monoester, a salt thereof, combinations of two or more thereof; and
    the combining is carried out under a condition sufficient to prevent or minimize the reduction of impact strength of the blend, to reduce the molten viscosity of the blend, or to minimize the loss in stiffness (flexural modulus) of the blend, in comparison to a blend without the modifier.

13. The process of claim 12 wherein process comprises combining the modifier and the filler to produce a sub-blend and combining the sub-blend with the PVC to produce the composition.

14. The process of claim 13 wherein the modifier is the ethylene butyl acrylate glycidyl methyl acrylate copolymer.

15. The process of claim 13 wherein the ethylene copolymer is the ethylene alkyl (meth)acrylate copolymer.

16. The process of claim 13 wherein the filler is the glass fiber and the ethylene copolymer is the ethylene butylacrylate copolymer, the ethylene butyl acrylate (meth)acrylic acid copolymer or its corresponding ionomer.

17. The process of claim 12 wherein the modifier is the acid anhydride- or acid monoester-modified polyolefin and the polyolefin includes polyethylene, polypropylene, or combinations thereof.

18. The process of claim 17 wherein the modifier is the maleic anhydride-modified polyethylene, polypropylene, or combinations thereof.

19. The process of claim 17 wherein the filler is the glass fiber.

20. A article comprising or produced from a composition wherein the article includes decorative moldings inside or outside of a house, railroad ties, picture frames, furniture, porch decks, railings, window moldings, window components, door components, roofing systems, sidings, pellets, slugs, rods, ropes, sheets, or molded articles and the composition is as recited in claim 1.

* * * * *